COMBINED LIMITER AND THRESHOLD CIRCUIT

Filed Nov. 19, 1958 2 Sheets-Sheet 1

INVENTOR.
ROBERT S. DAHLBERG, JR.
BY Robert D. Sanborn
ATTORNEY

Jan. 8, 1963 R. S. DAHLBERG, JR 3,072,801

COMBINED LIMITER AND THRESHOLD CIRCUIT

Filed Nov. 19, 1958 2 Sheets-Sheet 2

INVENTOR.
ROBERT S. DAHLBERG, JR.
BY Robert D. Sanborn
ATTORNEY 3,072,801

COMBINED LIMITER AND THRESHOLD CIRCUIT

Robert S. Dahlberg, Jr., Paoli, Pa., assignor, by mesne assignments, to Philco Corporation, Philadelphia, Pa., a corporation of Delaware Filed Nov. 19, 1958, Ser. No. 774,965
4 Claims. (Cl. 307—88.5)

The present invention relates to signal limiter circuits and more particularly to combined signal limiter and threshold circuits.

Communication systems have been developed which make use of a form of single-sideband, amplitude modulated transmission in which the amplitude modulation of the single-sideband is removed by limiting, leaving only the frequency variation of the sideband to convey the signal intelligence. It is customary in such systems to employ two limiters, one at the transmitter to remove amplitude variations in the signal arising from the amplitude modulation process and a second limiter at the receiver to remove amplitude variations introduced by variations in attenuation or by spurious signals in the signal transmission path. The constant-level, single-sideband transmission system shares the disadvantage of other forms of single-sideband transmission, that there is no sideband or carrier signal present in the absence of an intelligence signal. As a result, the automatic gain control circuits in the receiver tend to increase the gain of the receiver until spurious noise signals have an amplitude equal to the limiting level. To prevent this it is customary to transmit a supersonic tone at all times to control the automatic gain control circuits of the receiver and thus prevent the amplification of noise signals to the limiting level.

It is an object of the present invention to provide a novel limiter circuit which is useful both in the transmitter and the receiver of a constant-level, single-sideband communication system.

Another object of the present invention is to provide a novel threshold circuit and limiter for constant-level single-sideband receivers which makes the transmission of a supersonic gain control tone unnecessary.

In general these and other objects of the invention are achieved through the employment of a novel two-stage biased amplifier with regenerative feedback which is totally insensitive to positive or negative signals below a selected amplitude and which provides an output signal at either a first or a second fixed amplitude depending upon the polarity of the signal which last exceeded the threshold value.

For a better understanding of the present invention, together with other and further objects thereof, reference should now be made to the following detailed description which is to be read in conjunction with the accompanying drawings in which.

Figure 1:
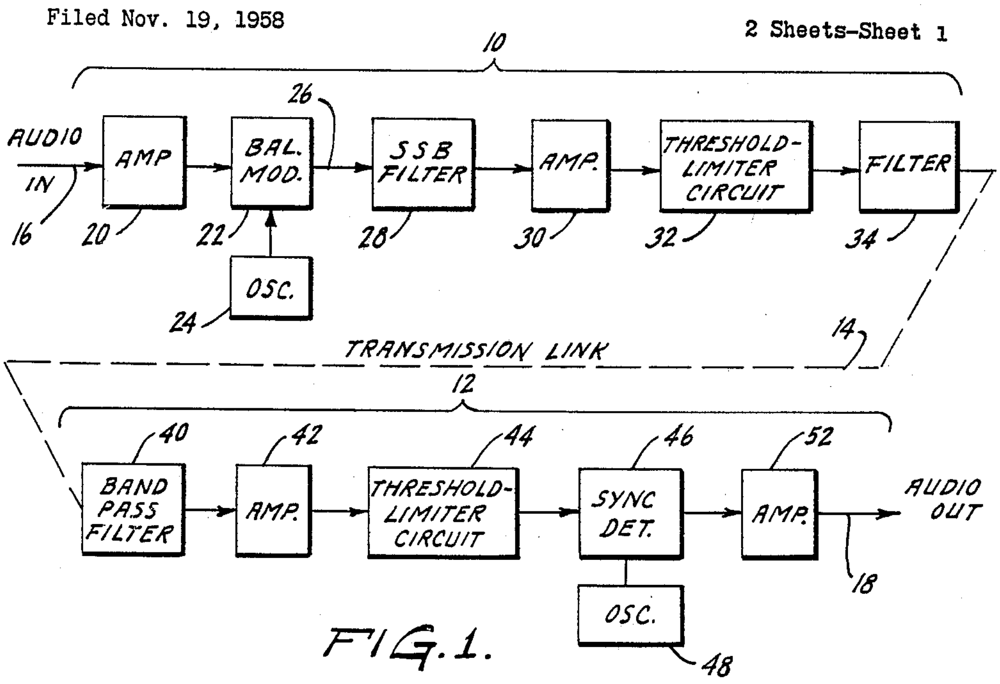
FIGURE 1 is a block diagram of a typical constant-level, single-sideband signal transmission system employing the present invention.

Turning now more particularly to the block diagram of FIGURE 1, the constant-level, single-sideband transmission system in this figure comprises a transmitter portion 10 and a receiver portion 12 connected by a transmission link represented by the dotted line 14. The transmission link 14 may comprise a wire line or a radio link of some convenient form. In describing the typical system of FIGURE 1 it is assumed that an audio signal is supplied at 16 and that a corresponding audio output signal is provided at output connection 18 of receiver 12. However other forms of signals within the capabilities of the constant-level, single-sideband transmission system may be supplied at input 16 to be transmitted to output connection 18.

The transmitter portion 10 in FIGURE 1 comprises an amplifier 20 which supplies an amplified version of the input signal to a balanced modulator 22. A local oscillator 24 also supplies a signal to balanced modulator 22. Modulator 22 provides a double-sideband suppressed carrier signal at output 26. A single-sideband filter 28 blocks one of the two sidebands and passes the other to an amplifier 30. The output of amplifier 30 is connected to the threshold and limiter circuit 32 which comprises the present invention. The limiting action of circuit 32 introduces harmonics of the sideband signal. Therefore a filter 34 is provided which removes these spurious harmonic signals before the constant-level, single-sideband signal is supplied to transmission link 14.

Figure 2:
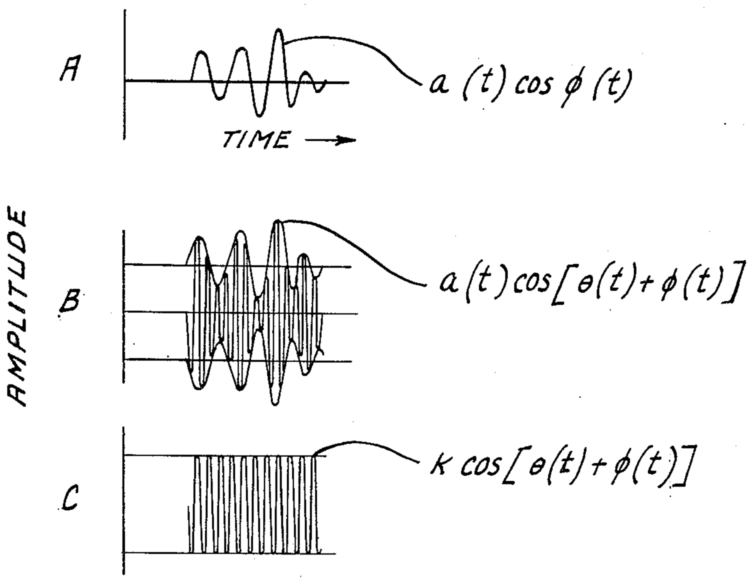
FIGURE 2 is a series of waveforms which explain the operation of the system of FIGURE 1.

The operation of the constant-level, single-sideband transmitter 10 of FIGURE 1 will be more fully understood by reference to FIGURE 2. Waveform A of FIGURE 2 represents the signal supplied at input 16. It will be noted that the waveform A of FIGURE 2 has an amplitude variation and a frequency variation which are functions of time. Waveform B of FIGURE 2 represents a sideband at the output of single-sideband filter 28. This signal is represented by the expression $$\text{“}a(t)\cos[\theta(t)+\phi(t)]\text{”}$$

It will be noted that this signal has the amplitude variation and frequency variation derived from the input signal at 16 plus a frequency variation derived from the carrier signal supplied by oscillator 24. Waveform C of FIGURE 2 represents the waveform B after having passed through amplifier 30 and limiter circuit 32. This signal is represented by the expression "$K\cos[\theta(t)+\phi(t)]$" where K is a constant. It will be noted that this constant-level signal shown as waveform C in FIGURE 2 still includes the frequency component of intelligence present in the signal supplied at input 16. The waveform shown at C in FIGURE 2 may be transmitted directly over a wire line or over a radio link or it may be superimposed on a suitable higher frequency carrier signal.

Turning once more to FIGURE 1 the receiver portion 12 of the communication system shown in FIGURE 1 comprises a bandpass filter 40 which has a passband that will accept the signal shown at C in FIGURE 2. The output of filter 40 is supplied through amplifier 42 to a second threshold-limiter circuit 44 which may be similar to the threshold-limiter circuit 32 in the transmitter portion of the communication system. The signal from limiter 44 is supplied to a synchronous detector circuit 46. An oscillator 48 supplies a carrier frequency which corresponds to carrier frequency 24 in the transmitter portion. The output of synchronous detector 46 is supplied to an amplifier 52 to the output connection 18.

It is believed that the operation of the receiver portion of FIGURE 1 will be obvious to those familiar with single-sideband radio communication systems. Bandpass filter 40 merely selects the appropriate signal from the transmission link to be amplified. If the transmission link 14 is a wire line which is supplied with only the signal from filter 34, then bandpass filter 40 may be omitted. The signal at the output of threshold-limiter circuit 44 will be as shown at C in FIGURE 2. The function of circuit 44 is to remove variations in amplitude which may have been impressed on the constant-level signal on its passage through the transmission link 14. The use of the limiter circuit 44 makes it unnecessary to provide an automatic gain control circuit in amplifier 42. As will be explained in more detail presently, the gain of amplifier 42 is adjusted so that the noise level is below the threshold level of limiter circuit 44 and so that the amplitude of the weakest intelligence signal exceeds the limiting level of circuit 44. The operation of synchronous detector 46, oscillator 48 and amplifier 52 are the same as in any single-sideband detection system.

Figure 3:
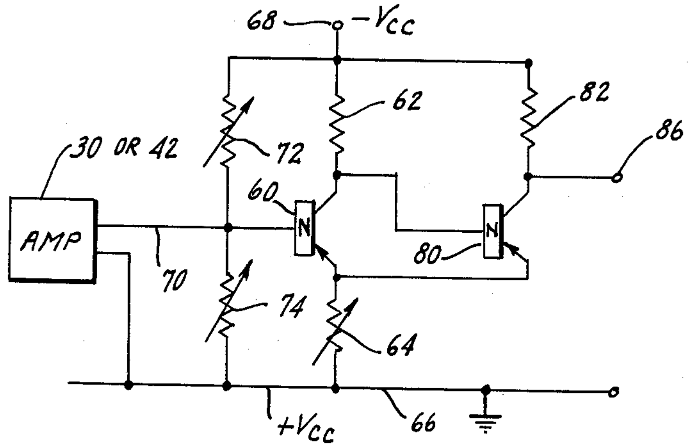
FIGURE 3 is a schematic diagram of a preferred embodiment of the present invention.

Turning now to FIGURE 3 it will be seen that the present invention comprises a transistor 60 having one load impedance 62 in the collector circuit and a second load impedance 64 in the emitter circuit. The series circuit comprising resistor 62, transistor 60 and resistor 64 is connected across the terminals of a source of supply potential. In FIGURE 3 the two terminals of the source are represented by the ground bus 66 and the terminal 68 which is also designated $-V_{CC}$. The signal from either amplifier 30 or amplifier 42 in FIGURE 1 is supplied to the base of transistor 60 by way of input connection 70. The base of transistor 60 is held at the proper operating bias by a potential divider consisting of variable resistances 72 and 74 which are connected in series between the negative supply terminal 68 and the ground bus 66. Either or both of the resistances 72 and 74 may be made adjustable to permit alteration of the bias on the base of transistor 60. A second transistor 80 has its emitter connected to the emitter of transistor 60 so that resistor 64 is shared as a common emitter resistance by transistors 60 and 80. The collector of tranistor 80 is connected to the negative supply terminal 68 by way of a load resistor 82. The base of transistor 80 is connected directly to the collector of transistor 60. The input terminals of the circuit of FIGURE 3 are lead 70 and the ground bus 66. The output terminals are the ground bus 66 and terminal 86 which is connected directly to the collector of transistor 80.

Figure 4:
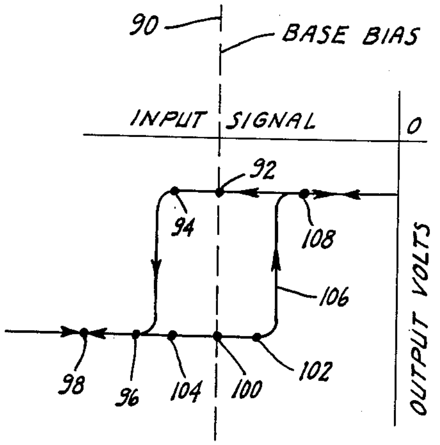
FIGURE 4 is a plot showing the output versus input characteristic of the circuit of FIGURE 3.

The operation of the circuit of FIGURE 3 will now be explained with reference to the characteristic diagram of FIGURE 4. First it will be assumed that transistor 80 is conducting so that output terminal 86 is at a low negative potential with respect to ground. It will be assumed further that no signal is being supplied by amplifier 42 for example, and that resistors 72 and 74 are adjusted to provide a bias represented by the broken line 90 in FIGURE 4. The operating point of the amplifier will then be at point 92. If the amplifier 42 supplies a small amplitude negative signal to conductor 70, such as might result from noise signals picked up in the transmission link 14 or in the bandpass filter 40 or amplifier 42 which proceeds the limiter, the operating point of the circuit of FIGURE 3 will move to some point such as 94. As will be seen from FIGURE 3, this small signal applied to input lead 70 will not result in any appreciable change in the output signal level. Suppose now a somewhat larger negative signal is supplied to input lead 70. This larger negative signal will cause transistor 60 to conduct, thus causing the collector voltage of transistor 60 to approach ground potential. This drop in potential of the collector of transistor 60 also appears as a drop in the base potential of transistor 80. The drop in potential on the base of transistor 80 tends to reduce current flow through this transistor. The reduction in current flow through resistor 64 increases the emitter to base potential of transistor 60 and causes conduction through this transistor to increase still further. It will be seen that a regenerative action results which causes transistor 60 to conduct heavily, and transistor 80 to be cut off entirely. As a result the output potential of terminal 86 will be as represented by point 96 in FIGURE 4. Any further increase in the negative signal applied to input lead 70 will merely move the operating point of the circuit to point 98 with no appreciable change in the amplitude of the output signal. If the negative signal supplied by amplifier 42 is now removed, a circuit of FIGURE 3 will return to an operating point at 100 rather than to operating point 92. Again a small positive or negative signal on input lead 70 will merely move the operating point to points 102 or 104 respectively without changing the level of output tap 86. A large positive signal supplied to input lead 70 will cause transistor 60 to be cut off. This will increase the negative potential on the collector of transistor 60 and turn transister 80 on. The regenerative action of the circuit will cause the operating point of the amplifier to move by way of path 106 to an operating point such as point 108. Thus, the hysteresis curve of FIGURE 4 is a bi-valued function of input signal amplitude between points 96 and 108. It will be seen from FIGURE 4 that the potential of output connection 86 with respect to ground changes only when the input signal changes from a negative potential to a positive potential above a preselected minimum or vice versa.

The width of the hysteresis loop and hence the threshold level at which the circuit will respond may be adjusted by changing the value of resistor 64. If the value of this resistor is changed, it would usually be necessary to readjust either resistor 72 or 74 to center the base bias potential 90 in approximately the center of the hysteresis loop, that is, the center of the bi-valued portion of the hysteresis curve. In many instances it may not be necessary or desirable to place the bias value 90 in exactly the center of the hysteresis loop since the characteristics of the transmission link may result in noise signals having higher positive peaks than negative peaks, for example. The peak to peak amplitude of the output voltage may be selected by selecting the value of resistor 82 or by connecting output tap 86 to an intermediate point on resistor 82.

Figure 5:
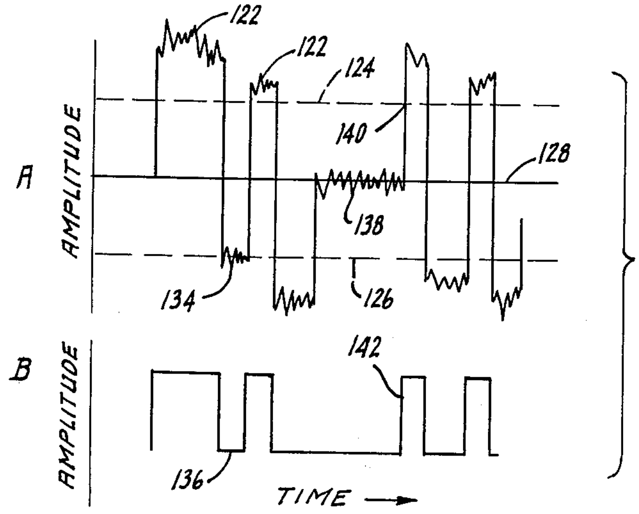
FIGURE 5 is a series of waveforms on a common time scale which illustrate the limiting and signal threshold action of the circuit of FIGURE 3.

FIGURE 5 illustrates the action of the circuit in FIGURE 3 when supplied with typical constant-level, single-sideband modulation signals. Waveform A in FIGURE 5 represents a constant-level, single-sideband signal which may have been contaminated with noise signals 122 and a low frequency amplitude modulation of some of the peaks. The threshold level of the circuit of FIGURE 3 is represented by the broken lines 124 and 126 respectively. Solid line 128 represents the bias which may be set by resistors 72 and 74. Waveform B in FIGURE 5 represents the signal appearing at output tap 86. It will be noted that the circuit of FIGURE 3 does not function merely as a clipper circuit. For example, the noise pulses at 134 in the waveform A of FIGURE 5 swing the signal up and down over the clipping level 126. However the output signal is not affected by this as shown at 136. This is due to the threshold characteristic of the circuit of FIGURE 3. Similarly the drop in the output signal to zero amplitude at 138 in waveform A of FIGURE 5 and the noise modulation present during this time do not change the amplitude of the signal appearing at output tap 86. The potential of this tap does not change until the signal becomes more positive than the threshold level 124 as shown at 140 and 142 in waveforms A and B respectively of FIGURE 5.

While the invention has been described with reference to a single embodiment thereof, it will be apparent that various modifications and other embodiments thereof will occur to those skilled in the art within the scope of the invention. Accordingly I desire the scope of my invention to be limited only by the appended claims.

What is claimed is:

1. A signal limiter and threshold circuit comprising first and second transistors, each transistor having an emitter, a base and a collector, a source of supply potential having first and second terminals of different potential, a first resistor connected at one end to the emitters of said first and second transistors and at the other end to said first terminal of said source of supply potential, a second resistor connected between the collector of said first transistor and said second terminal of said supply source, a third resistor connected between said collector of said second transistor and said second terminal of said supply source, said base of said second transistor being directly connected to said collector of said first transistor, said first resistor having a resistance at least equal to the value which will cause said circuit to have a hysteresis loop type input-output characteristic, said base of said first transistor being electrically isolated from said base, collector and emitter of said second transistor, whereby the signal supplied to the base of said first transistor is independent of the state of conduction of said second transistor, means for biasing said base of said first transistor to a selected point on the bi-valued portion of said hysteresis loop characteristic, and means for supplying an input signal to said base of said first transistor.

2. A signal limiter and threshold circuit comprising first and second transistors, each of said transistors having an emitter, a collector and a base, a source of supply potential having first and second terminals at different potential, a first resistor connected at one end to the emitters of said two transistors and at the other end to said first terminal of said source of supply potential, said first resistor being adjustable to vary the threshold level of said circuit, said first resistor having values such that the input-output characteristic of said circuit is a bi-valued function of input signal amplitude for a selected range of input signal amplitudes, a second resistor connected between said collector of said first transistor and said second terminal of said supply source, a third resistor connected between said collector of said second transistor and said second terminal of said supply source, said base of said second transistor being connected to said collector of said first transistor, said base of said first transistor being electrically isolated from said base, emitter and collector connections of said second transistor whereby the signal supplied to said base of said first transistor is independent of the state of conduction of said second transistor, first and second adjustable resistors connected in series between said first and second terminals of said supply source, said base of said first transistor being connected directly to an intermediate point on said two last-mentioned series connected resistors, said first and second adjustable resistors having values such that said base of said first transistor is biased at a bi-valued portion of the input-output characteristic of said circuit and means for supplying an input signal to the base of said first transistor.

3. A signal limiter and threshold circuit comprising first and second transistors, each transistor having an emitter, a base and a collector, a source of supply potential having first and second terminals of different potential, a first resistor connected at one end to the emitters of said first and second transistors and at the other end to said first terminal of said source of supply potential, a second resistor connected between the collector of said first transistor and said second terminal of said source of supply potential, a third resistor connected between said collector of said second transistor and said second terminal of said source of supply potential, said base of said second transistor being directly connected to said collector of said first transistor, said base of said first transistor being electrically isolated from said base, emitter and collector of said second transistor whereby the signal supplied to the base of said first transistor is independent of the state of conduction of said second transistor, the values of said first, second and third resistors being such that said base of said first transistor is driven a preselected amount below current cut-off and a preselected amount into the saturated current region upon the reception of selected signals of first and second polarities, respectively, whereby said circuit is caused to have a hysteresis loop-type input-output characteristic, means for biasing said base of said first transistor to a selected point on a bi-value portion of said hysteresis characteristic, and means for supplying input signals to said base of said first transistor.

4. A signal limiter and threshold circuit comprising first and second transistors, each of said transistors having an emitter, a collector and a base, a source of supply potential having first and second terminals at different potentials, a first resistor connected at one end to the emitters of said two transistors and at the other end to said first terminal of said source of supply potential, said first resistor being adjustable to vary the threshold level of said circuit, said first resistor having values such that the input-output characteristic of said circuit is a bi-valued function of input signal amplitude for a selected range of input signal amplitudes, a second resistor connected between said collector of said first transistor and said second terminal of said supply source, a third resistor connected between said collector of said second transistor and said second terminal of said supply source, said base of said second transistor being connected directly to said collector of said first transistor, said base of said first transistor being electrically isolated from said emitter, base and collector of said second transistor whereby the signal supplied to said base of said first transistor is independent of the state of conduction of said second transistor, said first resistor having a value at least equal to the value which will cause said base of said first transistor to be driven a preselected amount below current cut-off and a preselected amount into the current saturation region of said first transistor on alternate states of conduction of said circuit, first and second adjustable resistors connected in series between said first and second terminals of said supply source, said base of said first transistor being connected to an intermediate point of said two last-mentioned series connected resistors, said first and second adjustable resistors having values such that said base of said first transistor is biased to a bi-valued portion of the input-output characteristic of said circuit and means for supplying an input signal to the base of said first transistor.

References Cited in the file of this patent

UNITED STATES PATENTS

| | | |
|---|---|---|
| 2,747,111 | Koch | May 22, 1956 |
| 2,778,978 | Drew | Jan. 22, 1957 |
| 2,814,736 | Hamilton | Nov. 26, 1957 |
| 2,867,695 | Buie | Jan. 6, 1959 |
| 2,881,333 | Pickard | Apr. 7, 1959 |
| 2,923,818 | Wilson | Feb. 2, 1960 |
| 3,013,159 | De Sautels | Dec. 12, 1961 |

OTHER REFERENCES

"Electronics," Elmore & Sands, McGraw-Hill, 1949, 1st edition, pages 99 to 103.

Electronics Design, October 1, 1957, by Smith, pages 24 to 26.